United States Patent
Flajslik et al.

(10) Patent No.: US 11,153,105 B2
(45) Date of Patent: Oct. 19, 2021

(54) TECHNOLOGIES FOR DENSELY PACKAGING NETWORK COMPONENTS FOR LARGE SCALE INDIRECT TOPOLOGIES

(71) Applicant: Intel Corporation, Santa Clara, CA (US)

(72) Inventors: Mario Flajslik, Hudson, MA (US); Eric R. Borch, Fort Collins, CO (US); Michael A. Parker, Santa Clara, CA (US); Richard J. Dischler, Bolton, MA (US)

(73) Assignee: Intel Corporation, Santa Clara, CA (US)

( * ) Notice: Subject to any disclaimer, the term of this patent is extended or adjusted under 35 U.S.C. 154(b) by 829 days.

(21) Appl. No.: 15/636,766

(22) Filed: Jun. 29, 2017

(65) Prior Publication Data

US 2019/0007224 A1 Jan. 3, 2019

(51) Int. Cl.
*H04L 12/12* (2006.01)
*H04L 12/24* (2006.01)
(Continued)

(52) U.S. Cl.
CPC .............. *H04L 12/12* (2013.01); *H04L 12/44* (2013.01); *H04L 41/0803* (2013.01);
(Continued)

(58) Field of Classification Search
CPC .. H05K 7/1487; H05K 7/1485; H05K 7/1489; H05K 7/1491; H05K 7/1492;
(Continued)

(56) References Cited

U.S. PATENT DOCUMENTS

| 8,411,465 B2 * | 4/2013 | Dean, Jr. ............. G02B 6/4459 361/826 |
| 8,456,859 B2 * | 6/2013 | Dahlfort ................. H04Q 1/15 361/796 |

(Continued)

FOREIGN PATENT DOCUMENTS

| CN | 109315075 A | * | 2/2019 | ............. H01R 35/02 |
| CN | 109315075 B | * | 10/2020 | ............. H01R 35/02 |

(Continued)

OTHER PUBLICATIONS

Carlson, Considerations for choosing top-of-rack in today's fat-tree switch fabric configurations, Apr. 2014, Cabling Installation & Maintenance Magazine (Year: 2014).*

(Continued)

*Primary Examiner* — Eric Nowlin
(74) *Attorney, Agent, or Firm* — Compass IP Law PC

(57) ABSTRACT

Technologies for densely packaging network components for large scale indirect topologies include group of switches. The group of switches includes a stack of node switches that includes a first set of ports and a stack of global switches that includes a second set of ports. The stack of node switches are oriented orthogonally to the stack of global switches. Additionally, the first set of ports are oriented towards the second set of ports and the node switches are connected to the global switches through the first and second sets of ports. Other embodiments are also described and claimed.

19 Claims, 7 Drawing Sheets

(51) Int. Cl.
*H04L 12/44* (2006.01)
*H04W 40/28* (2009.01)
*H04L 12/721* (2013.01)
*H04L 12/933* (2013.01)

(52) U.S. Cl.
CPC .............. *H04L 41/12* (2013.01); *H04L 45/12* (2013.01); *H04L 49/15* (2013.01); *H04W 40/28* (2013.01)

(58) Field of Classification Search
CPC .. H05K 7/18; H05K 7/20572; H05K 7/20709; H05K 7/20736; H04L 12/12; H04L 12/44; H04W 40/28
See application file for complete search history.

(56) References Cited

U.S. PATENT DOCUMENTS

| | | | | |
|---|---|---|---|---|
| 8,804,710 | B2* | 8/2014 | Aybay | H04L 49/1515 |
| | | | | 370/388 |
| 8,804,711 | B2* | 8/2014 | Aybay | H04L 49/15 |
| | | | | 370/388 |
| 9,225,666 | B1* | 12/2015 | Aybay | H04L 49/25 |
| 10,063,494 | B1* | 8/2018 | Aybay | H04Q 11/00 |
| 10,356,955 | B2* | 7/2019 | Schmidtke | H05K 7/20736 |
| 10,425,324 | B2* | 9/2019 | Camacho Villanueva | |
| | | | | H04L 45/14 |
| 10,524,380 | B2* | 12/2019 | Brink | H05K 7/1491 |
| 10,721,127 | B2* | 7/2020 | Shimizu | H04L 49/358 |
| 10,986,423 | B2* | 4/2021 | Rose | H05K 7/20545 |
| 2010/0165983 | A1* | 7/2010 | Aybay | H04L 49/00 |
| | | | | 370/388 |
| 2010/0165984 | A1* | 7/2010 | Aybay | H04L 49/10 |
| | | | | 370/388 |
| 2011/0002108 | A1* | 1/2011 | Dahlfort | H04Q 1/08 |
| | | | | 361/796 |
| 2011/0080855 | A1* | 4/2011 | Fung | H04L 45/58 |
| | | | | 370/256 |
| 2015/0295655 | A1* | 10/2015 | Hessong | H04B 10/27 |
| | | | | 398/58 |
| 2017/0187629 | A1* | 6/2017 | Shalev | H04L 69/10 |
| 2019/0044807 | A1* | 2/2019 | Shimizu | H04L 41/12 |
| 2019/0058652 | A1* | 2/2019 | Camacho Villanueva | |
| | | | | H04L 45/14 |
| 2019/0150312 | A1* | 5/2019 | Brink | H01R 35/02 |
| | | | | 361/699 |
| 2019/0379598 | A1* | 12/2019 | Johnsen | H04L 45/24 |
| 2020/0034171 | A1* | 1/2020 | Kommula | G06F 9/45558 |
| 2020/0037473 | A1* | 1/2020 | Kommula | G06F 30/20 |
| 2020/0146170 | A1* | 5/2020 | Thubert | H05K 7/1492 |
| 2020/0323097 | A1* | 10/2020 | Demange | G06F 1/181 |
| 2020/0329286 | A1* | 10/2020 | Rose | H04Q 1/025 |

FOREIGN PATENT DOCUMENTS

| | | | | |
|---|---|---|---|---|
| EP | 3466225 A1 * | 4/2019 | .......... | H05K 7/1491 |
| NL | 2016812 B1 * | 11/2017 | .......... | H05K 7/1492 |
| WO | WO-2017202717 A1 * | 11/2017 | .......... | H05K 7/1491 |

OTHER PUBLICATIONS

Wrightson, Data Center Fundamentals, Sep. 2016, Juniper Networks, Version 1 (Year: 2016).*

Molex, "Molex Showcases Impulse Orthogonal Direct Backplane Connector at DesignCon 2017", Jan. 31, 2017, 2 pages, Retrieved from internet: https://www.molex.com/molex/news/display_news.jsp?channel=New&channelId=0&oid=2183.

* cited by examiner

TECHNOLOGIES FOR DENSELY PACKAGING NETWORK COMPONENTS FOR LARGE SCALE INDIRECT TOPOLOGIES

STATEMENT REGARDING FEDERALLY SPONSORED RESEARCH

This invention was made with Government support under contract number H98230A-13-D-0124 awarded by the Department of Defense. The Government has certain rights in this invention.

BACKGROUND

Typical solutions for physically assembling groups of networking components, such as switches, for use in large scale indirect network topologies, such as a three-level fat-tree topology (e.g., a topology in which nodes are connected to node switches, which are connected to global switches, which, in turn, are connected to root switches), or a Megafly topology (e.g., a topology in which nodes are connected to node switches, which are connected to global switches, which, in turn, are connected directly to other global switches), are relatively low density. For example, a typical solution is to place a node switch at the top of a cabinet of nodes and connect the node switches from the various cabinets to global switches, which may be located elsewhere. This arrangement is costly as it can require long cables to connect each node switch to the corresponding global switches (e.g., switches that route packets from the present group to another group of switches and nodes). Other solutions that provide higher density typically do so at the cost of signal integrity. For example, one solution involves doubling the number of nodes connected to a single node switch (e.g., doubling from 16 nodes to 32 nodes). However, doubling the number of nodes and co-locating all of the nodes with the single node switch may decrease the integrity of signals carrying data to and from the node switch (e.g., due to electromagnetic interference between the connections).

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
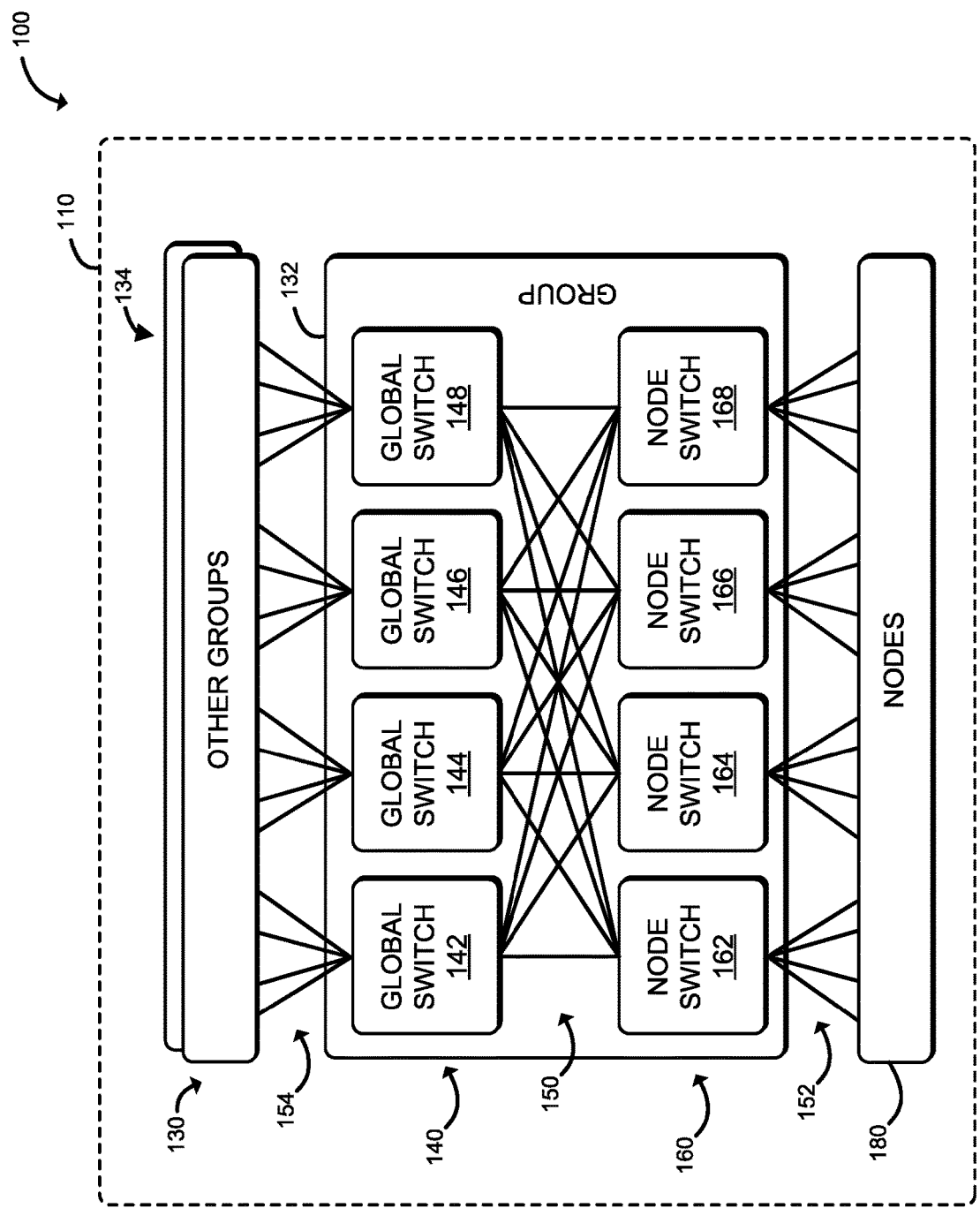
FIG. 1 is a simplified block diagram of at least one embodiment of a system in which global switches and node switches of a group are densely packaged together in a large scale indirect network topology.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

As shown in FIG. 1, in an illustrative system 100, groups 130 of global switches 140 and node switches 160, are densely packaged together and are in communication with corresponding nodes 180 and other groups 130 in a large scale indirect network 110. A large scale indirect network 110 may be embodied as a network having a topology in which nodes 180 (e.g., any devices capable of executing workloads, such as processes, applications, or other tasks and that, in operation, send and receive packets through the network 110) are connected to other nodes 180 through at least two layers of switches (e.g., the node switches 160 and the global switches 140). The switches 140, 160 may be embodied as any devices capable of routing packets among devices connected to them (e.g., from nodes 180 to global switches 140, from node switches 160 to other global switches 140, etc.). The global switches 140 of one group 132 may be connected directly to the global switches of other groups 134 through global links 154 (e.g., fiber optic cables) such as in a topology known as "Megafly" or may be indirectly connected to the global switches of other groups 134 through yet another layer of switches, known as "root switches" (not shown), such as in a network topology known as a three-level fat-tree. The node switches 160 are connected to corresponding nodes 180 through node links 152 (e.g., copper cables). Further, in the illustrative embodiment, the global switches 140 and the node switches 160 of a given group 130 (e.g., the group 132) are physically oriented orthogonally to each other and packaged together in a portion of a cabinet (e.g., a networking rack), enabling relatively short, low-cost links 150 (e.g., short copper cables) to connect each node switch 160 to each global switch 140. The global switches 140 include global switches 142, 144, 146, and 148 and the node switches 160 include node switches 162, 164, 166, and 168. While four global switches 140 and four node switches 160 are shown in FIG. 1, it should be understood that in other embodiment, each group 130 may include a different number of global switches 140 and node switches 160.

Figure 2:
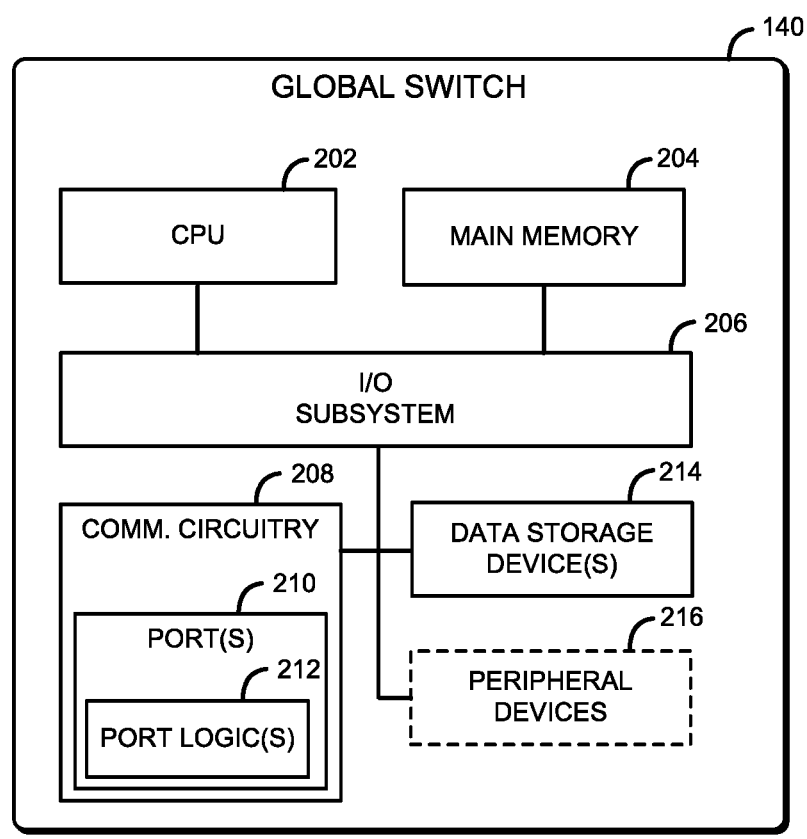
FIG. 2 is a simplified block diagram of at least one embodiment of a global switch of the system of FIG. 1.

Referring now to FIG. 2, each global switch 140 may be embodied as any type of compute device capable of performing the functions described herein, including receiving communications (e.g., network packets) from the node switches 160 in the group 132, routing the data communications out of the group 132 to another group 134 in the network 110 or to other node switches 160 in the present group 132, receiving communications from global switches of other groups 134 and routing the communications to node switches 160 of the present group 132. As shown in FIG. 2, the illustrative global switch 140 includes a central processing unit (CPU) 202, a main memory 204, an input/output (I/O) subsystem 206, communication circuitry 208, and one or more data storage devices 214. Of course, in other embodiments, the global switch 140 may include other or additional components, such as those commonly found in a computer (e.g., display, peripheral devices, etc.). Additionally, in some embodiments, one or more of the illustrative components may be incorporated in, or otherwise form a portion of, another component. For example, in some embodiments, the main memory 204, or portions thereof, may be incorporated in the CPU 202.

The CPU 202 may be embodied as any type of processor capable of performing the functions described herein. The CPU 202 may be embodied as a single or multi-core processor(s), a microcontroller, or other processor or processing/controlling circuit. In some embodiments, the CPU 202 may be embodied as, include, or be coupled to a field programmable gate array (FPGA), an application specific integrated circuit (ASIC), reconfigurable hardware or hardware circuitry, or other specialized hardware to facilitate performance of the functions described herein. Similarly, the main memory 204 may be embodied as any type of volatile (e.g., dynamic random access memory (DRAM), etc.) or non-volatile memory or data storage capable of performing the functions described herein. In some embodiments, all or a portion of the main memory 204 may be integrated into the CPU 202. In operation, the main memory 204 may store various software and data used during operation such as link status data, routing rules, applications, programs, libraries, and drivers.

The I/O subsystem 206 may be embodied as circuitry and/or components to facilitate input/output operations with the CPU 202, the main memory 204, and other components of the global switch 140. For example, the I/O subsystem 206 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some embodiments, the I/O subsystem 206 may form a portion of a system-on-a-chip (SoC) and be incorporated, along with one or more of the CPU 202, the main memory 204, and other components of the global switch 140, on a single integrated circuit chip.

The communication circuitry 208 may be embodied as any communication circuit, device, or collection thereof, capable of enabling communications over the network 110 between the global switch 140 and another device (e.g., another global switch 140 or node switch 160). The communication circuitry 208 may be configured to use any one or more communication technology (e.g., wired or wireless communications) and associated protocols (e.g., Ethernet, Bluetooth®, Wi-Fi®, WiMAX, etc.) to effect such communication.

The illustrative communication circuitry 208 includes multiple ports 210, each of which may be embodied as any device or circuitry capable of connecting the global switch 140 with another device (e.g., a node switch 160 or another global switch 140) for data communication. Each port 210, in the illustrative embodiment, includes a corresponding port logic 212, which may also be referred to as a network interface controller (NIC). The communication circuitry 208 may be located on silicon separate from the CPU 202, or the communication circuitry 208 may be included in a multi-chip package with the CPU 202, or even on the same die as the CPU 202. Each port logic 212 may be embodied as one or more add-in-boards, daughtercards, network interface cards, controller chips, chipsets, specialized components such as a field programmable gate array (FPGA) or application specific integrated circuit (ASIC), or other devices that may be used by the global switch 140 to connect with another device (e.g., another global switch 140 or a node switch 160) and communicate data. In some embodiments, port logic 212 may be embodied as part of a system-on-a-chip (SoC) that includes one or more processors, or included on a multichip package that also contains one or more processors. In some embodiments, the port logic 212 may include a local processor (not shown) and/or a local memory (not shown) that are both local to the port logic 212. In such embodiments, the local processor of the port logic 212 may be capable of performing one or more of the functions of the CPU 202 described herein. Additionally or alternatively, in such embodiments, the local memory of the port logic 212 may be integrated into one or more components of the global switch 140 at the board level, socket level, chip level, and/or other levels.

The one or more illustrative data storage devices 214 may be embodied as any type of devices configured for short-term or long-term storage of data such as, for example, memory devices and circuits, memory cards, hard disk drives, solid-state drives, or other data storage devices. Each data storage device 214 may include a system partition that stores data and firmware code for the data storage device 214. Each data storage device 214 may also include an operating system partition that stores data files and executables for an operating system.

Additionally, the global switch 140 may include one or more peripheral devices 216. Such peripheral devices 216 may include any type of peripheral device commonly found in a compute device such as a display, speakers, a mouse, a keyboard, and/or other input/output devices, interface devices, and/or other peripheral devices.

The node switches 160 and nodes 180 may have components similar to those described in FIG. 2. The description of those components are equally applicable to the description of components of the global switch 140 and is not repeated herein for clarity of the description, with the exception that in the nodes 180, the communication circuitry 208 typically includes a device or circuitry (e.g., a NIC) capable of connecting the node 180 to a corresponding node switch 160 rather than to multiple global switches 140 and multiple node switches 160. Further, it should be appreciated that the global switches 140, node switches 160, and/or nodes 180 may include other components, sub-components, and devices commonly found in a computing device, which are not discussed above for clarity of the description.

As described above, the fabric monitor 120, global switches 140, node switches 160, and nodes 180 are illustratively in communication via the network 110, which may be embodied as any type of wired or wireless communication network, including a fabric having a 3-level fat-tree topology or other large scale indirect topology (e.g., a Megafly topology), one or more local area networks (LANs) or wide area networks (WANs), cellular networks (e.g., Global System for Mobile Communications (GSM), 3G, Long Term Evolution (LTE), Worldwide Interoperability for Microwave Access (WiMAX), etc.), digital subscriber line (DSL) networks, cable networks (e.g., coaxial networks, fiber networks, etc.), global networks (e.g., the Internet), or any combination thereof.

Figure 3:
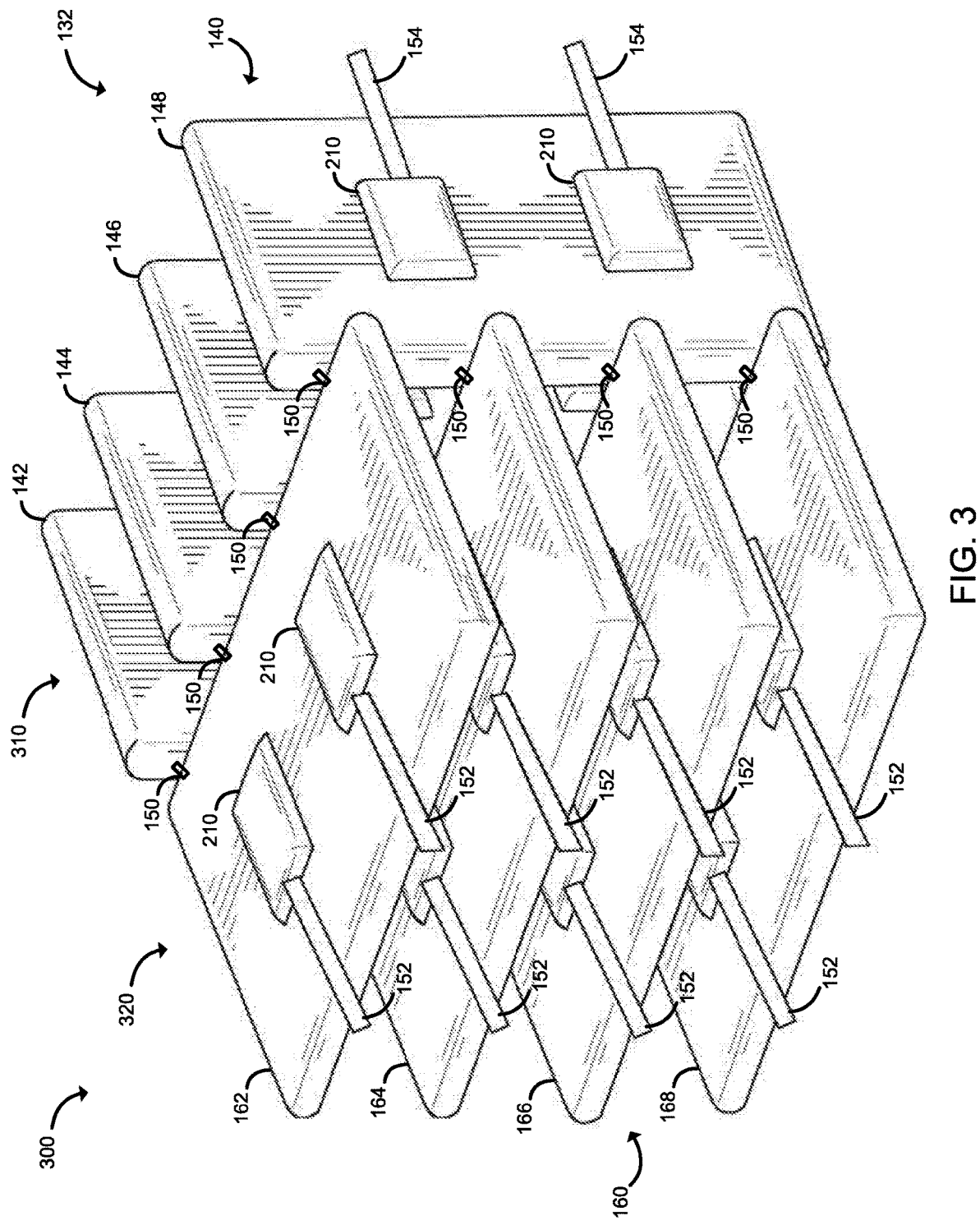
FIG. 3 is a simplified diagram of at least one embodiment of a high density packaging scheme of node switches and global switches in a group of the system of FIG. 1.

Referring now to FIG. 3, in the illustrative embodiment, in a high density packaging scheme 300 for the group 132, the node switches 160 are positioned in a stack 320 (e.g., a set of multiple items aligned along an axis, in which the face having the largest surface area on an item is adjacent to a corresponding face of another item in the stack) that is oriented orthogonally to a stack 310 of the global switches 140. In the illustrative embodiment, the stack 320 of node switches 160 spans the positions of where multiple trays would otherwise be installed in the rack. Furthermore, in the illustrative embodiment, the height of the stack 320 is approximately the width of a global switch 140. Likewise, in the illustrative embodiment, the stack 310 spans the width of a node switch 160. As such, if the width of a global switch 140 is approximately 18 inches, the height of the stack 320 is approximately 18 inches.

Further, in the illustrative high density packaging scheme 300, the ports 210 of the global switches 140 for the links 150 to the corresponding node switches 160 are facing the corresponding ports 210 of the node switches 160. As such, the ports 210 of any given global switch 140, such as the global switch 148, are opposite the corresponding ports 210 of the node switches 162, 164, 166, and 168. Similarly, the ports 210 of any given node switch 160, such as the node switch 162, are opposite the corresponding ports 210 of the global switches 142, 144, 146, 148 in the group 132. The orthogonal spatial relationship between the global switches 140 and the node switches 160 in the group 132 enables the physical links 150 between the switches 140, 160 to be shorter and lower cost than in typical systems in which each node switch 160 is located at the top of a corresponding cabinet (also referred to as a "rack") rather than sharing a portion of a single cabinet with the corresponding global switches 140. In the illustrative embodiment, the ports 210 of the node switches 160 for the links 152 between the node switches 160 and the nodes 180 are directed away from the global switches 140. Similarly, the ports 210 of the global switches 140 for the links 154 between the global switches 140 of the group 132 and the global switches of the other groups 134 (or to root switches), are directed away from the node switches 160. As described in more detail herein, the links 152 between the node switches 160 and the node 180 are, in the illustrative embodiment, of approximately equal length and are made of relatively lower cost cable (e.g., copper cable) while the links 154 between the global switches 140 of the group 132 and the global switches 140 of the other groups 134 are made of relatively higher cost cable (e.g., fiber optic cable) to support greater throughput and longer distances. It should be understood that, in some embodiments, multiple global switches 140 may be positioned along a particular plane (e.g., in a blade) of the stack 310 and, likewise, multiple node switches 160 may be positioned along an orthogonal plane (e.g., in another blade) of the stack 320.

Figure 4:
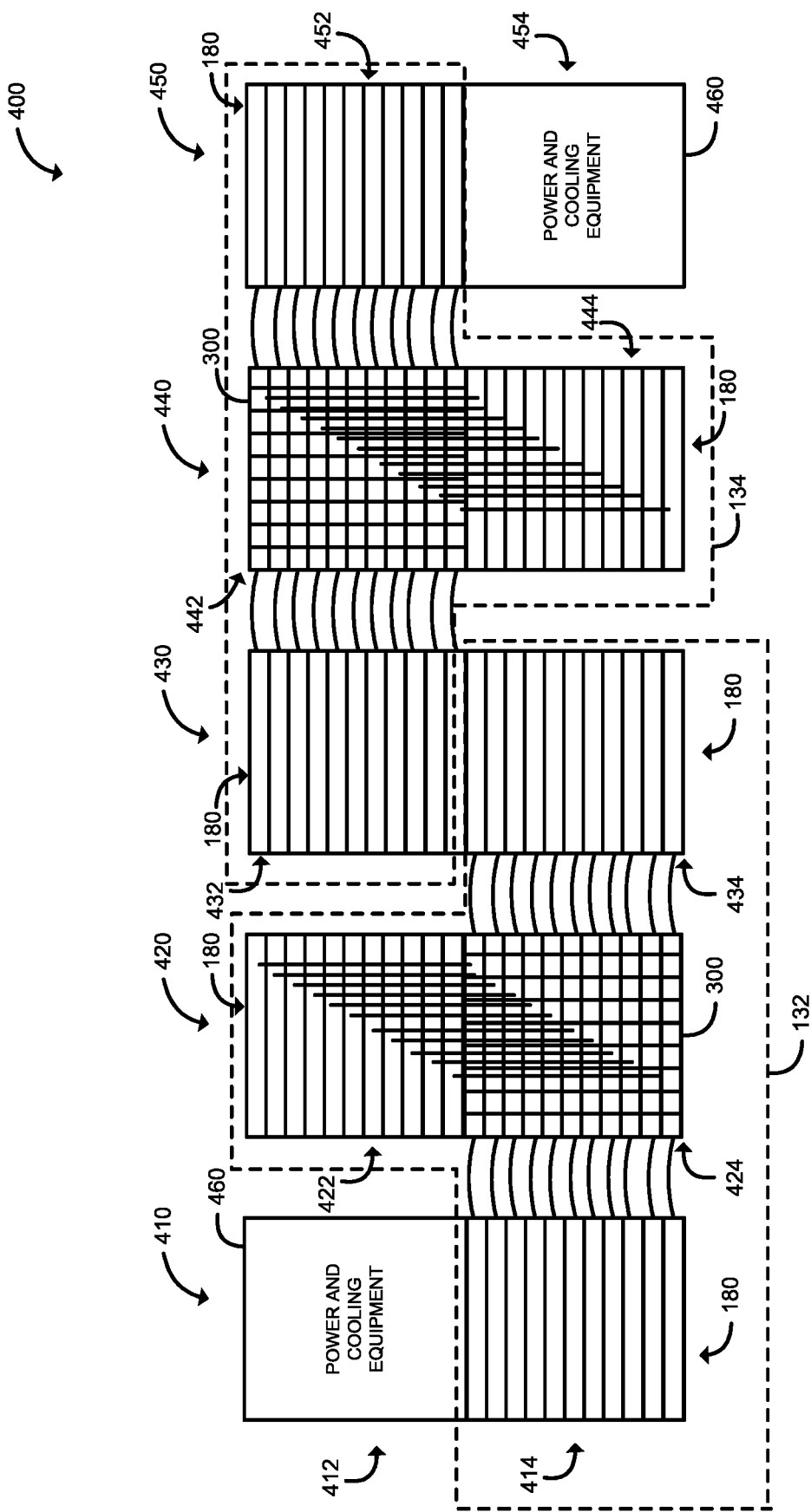
FIG. 4 is a simplified block diagram of at least one embodiment of a high density packaging scheme of multiple groups of switches and corresponding nodes among multiple cabinets in the system of FIG. 1.

Referring now to FIG. 4, an illustrative embodiment of a high density packaging scheme 400 of multiple groups 132, 134 of switches (e.g., the global switches 140 and the node switches 160) and the corresponding nodes 180 includes multiple cabinets 410, 420, 430, 440, and 450. The cabinet 410 includes an upper portion 412 in which power and cooling equipment 460 is located. The power and cooling equipment 460 may be embodied as any devices or components, such as transformers, rectifiers, and electronic filters, capable of providing power to the global switches 140, node switches 160, and nodes 180 and any devices or components, such as heat pipes, heat sinks, and fans capable of transferring heat away from the global switches 140, node switches 160, and nodes 180 to maintain a target temperature. The cabinet 410 additionally includes a lower portion 414 in which a set of nodes 180 are positioned.

The cabinet 420 includes an upper portion 422 in which additional nodes 180 are positioned. A lower portion 424 of the cabinet 420 includes the global switches 140, represented by vertical lines spanning the height of the lower portion 424, and the node switches 160, represent by horizontal lines spanning the width of the lower portion 424. The global switches 140 and node switches 160 are assembled in the high density packaging scheme 300 of FIG. 3 and are supported by a single tray at the bottom of the lower portion 424 of the cabinet 420. The vertical lines between the upper portion 422 and the lower portion 424 represent the node links 152 (e.g., copper cables) between the node switches 160 and the nodes 180 of the group 132. The cabinet 430 includes an upper portion 432 in which nodes 180 corresponding to another group 134 are positioned. Additionally, the cabinet 430 includes a lower portion 434 in which nodes 180 corresponding to the group 132 are positioned. Further, the cabinet 440 includes, in an upper portion 442, global switches 140 and node switches 160 of the group 134, assembled according to the high density packaging scheme 300 of FIG. 3. In addition, the cabinet 440 includes a lower portion 444 in which a set of nodes 180 corresponding to the group 134 are positioned. Further, the cabinet 450 includes an upper portion 452, in which an additional set of nodes 180 are positioned, and a lower portion 454 in which additional power and cooling equipment 460 is located. In the illustrative embodiment, for racks 420 and 440, the width of the node switch spans half the height of the rack (or at least more than the 18 inches in the embodiment discussed in association with FIG. 2)

In the illustrative embodiment 400, there is a three to one ratio of nodes to switches 140, 160 for each group 130. Further, in the illustrative embodiment 400, the links 152 between the node switches 160 and the corresponding nodes 180 are of approximately equal length (e.g., within two inches of each other) and are made of relatively low cost material (e.g., copper cables). As such, the cost and complexity associated with setting up and/or replacing the links 152 is lower than in typical systems in which the links 152 are of different materials and/or lengths. While two groups 130 are shown in FIG. 4, it should be understood that other groups 130 in the network 110 may be similarly packaged.

Figure 5:
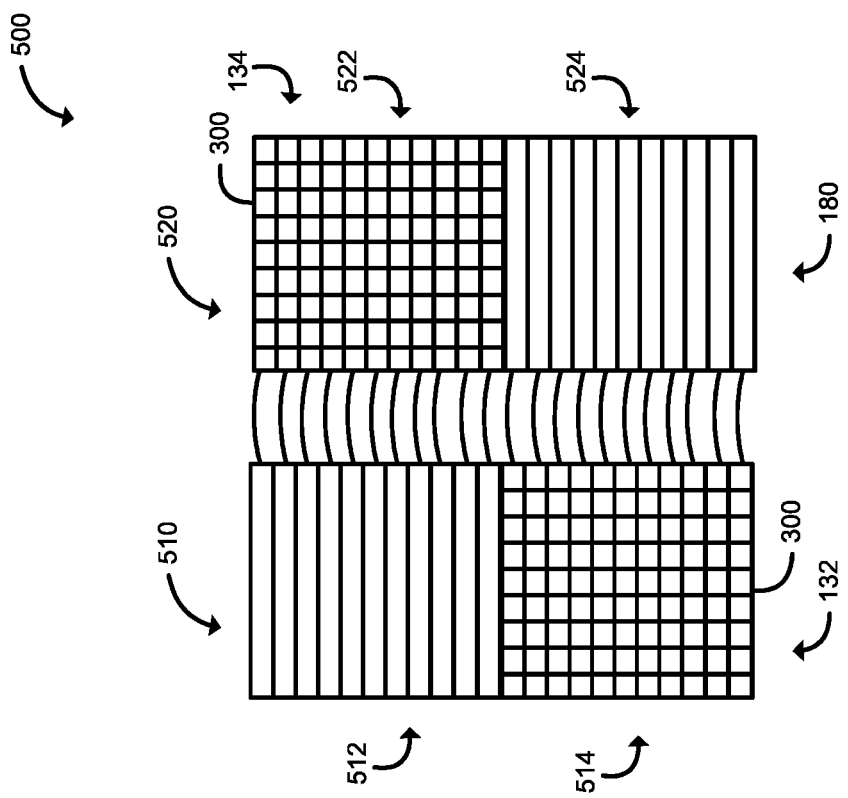
FIG. 5 is a simplified block diagram of at least one alternative embodiment of a high density packaging scheme of multiple groups of switches and corresponding nodes among multiple cabinets in the system of FIG. 1.

Referring now to FIG. 5, an alternative high density packaging scheme 500, includes cabinets 510, 520. In the packaging scheme 500, the ratio of nodes 180 to switches 140, 160 is one to one, rather than three to one, as in the high density packaging scheme 400 of FIG. 4. The cabinet 510 includes an upper portion 512, in which nodes 180 corresponding to the group 134 are positioned. The cabinet 510 also includes a lower portion 514 in which the global switches 140 and node switches 160 of the group 132 are arranged according to the high density packaging scheme 300 of FIG. 3. Further, the cabinet 520 includes an upper portion 522, in which the global switches 140 and node switches 160 of the group 134 are arranged according to the high density packaging scheme 300 of FIG. 3. Additionally, the cabinet 520 includes a lower portion 524 in which the nodes 180 corresponding to the group 132 are positioned. Similar to the high density packaging scheme 400, the links 152 between the node switches 160 and the corresponding nodes 180 are of approximately equal length and are made of a relatively low cost material, such as copper cables. While embodiments in which the ratio of nodes 180 to switches 140, 160 is three to one or one to one have been described above, it should be understood that in other embodiments, the ratio of nodes 180 to switches 140, 160 may be different (e.g., two to one, etc.).

Figure 6:
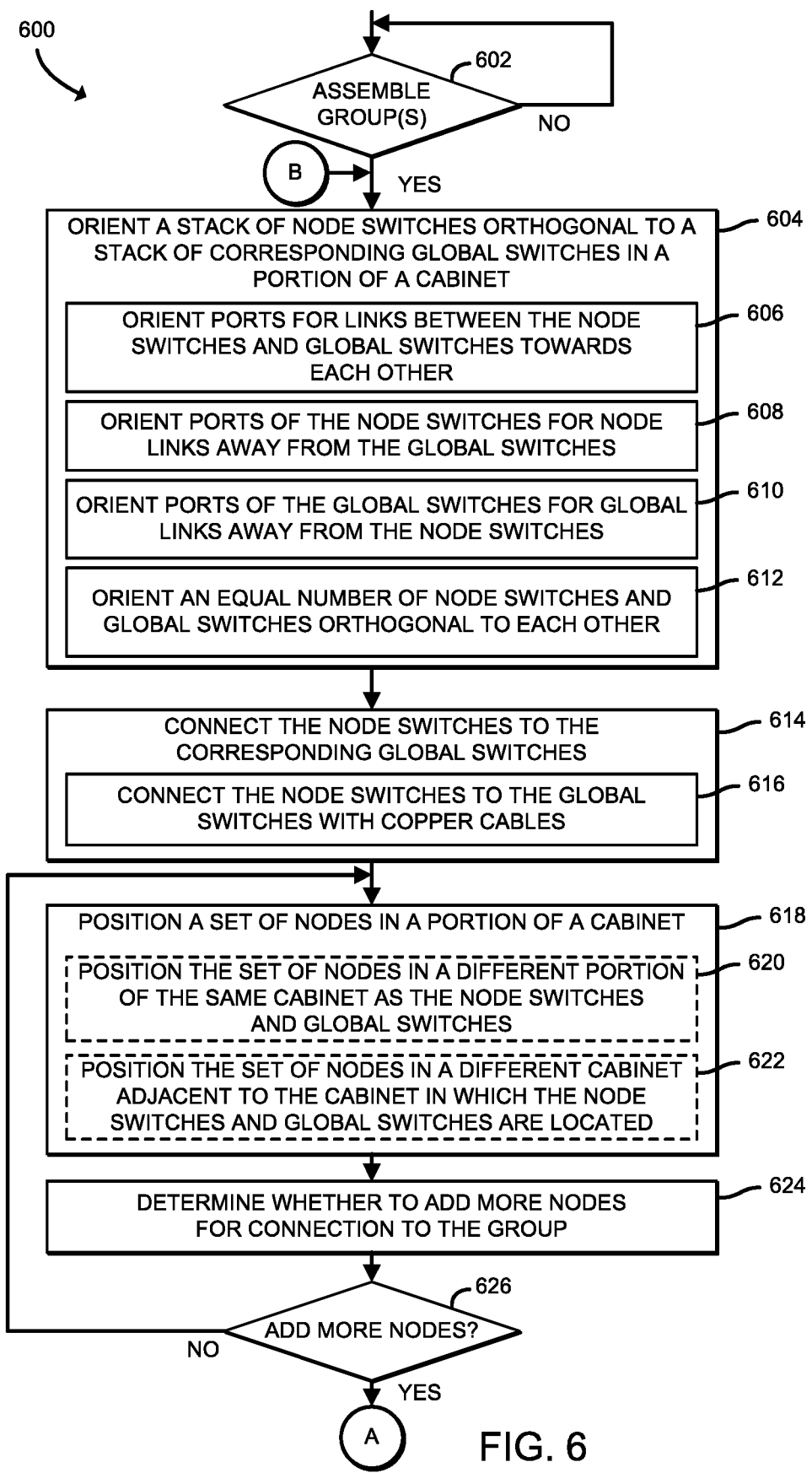
FIG. 6-7 are a simplified flow diagram of at least one embodiment of a method for physically assembling one or more groups of global switches, node switches, and nodes to produce the system of FIG. 1.

Referring now to FIG. 6, in the illustrative embodiment, a network technician (e.g., a human or a robot) may perform a method 600 of assembling one or more groups 130 according to one or more of the high density packaging schemes 300, 400, 500 of FIGS. 3-5. The method 600 begins with block 602 in which the network technician determines whether to assemble one or more groups 130. In the illustrative embodiment, the network technician determines whether to assemble one or more groups 130 in response to an instruction or determination to build or extend a large scale indirect network, such as the network 110 of FIG. 1. In other embodiments, the network technician may determine to assemble the one or more groups 130 based on other factors. Regardless, in response to a determination to assemble one or more groups 130, the method 600 advances to block 604 in which the network technician orients a stack of node switches 160 (e.g., the stack 320) orthogonally to a stack of corresponding global switches 140 (e.g., the stack 310) in a portion (e.g., the lower portion 424) of a cabinet (e.g., the cabinet 420 of FIG. 4). In doing so, in the illustrative embodiment, the network technician orients the ports 210 for the links (e.g., the links 150) between the node switches 160 and the global switches 140 towards each other (e.g., facing each other), as indicated in block 606. Additionally, in the illustrative embodiment, the network technician orients the ports 210 of the node switches 160 for node links (e.g., the links 152) away from the global switches 140, as indicated in block 608. Further, in the illustrative embodiment, the network technician orients the ports 210 of the global switches 140 for global links (e.g., the links 154) away from the node switches 160, as indicated in block 610. In addition, in the illustrative embodiment, the network technician orients an equal number of node switches 160 and global switches 140 orthogonally to each other (e.g., the four node switches 162, 164, 166, 168 are oriented orthogonally to the four global switches 142, 144, 146, 148), as indicated in block 612. In other embodiments, the number of node switches 160 may be different from the number of global switches 140.

Subsequently, in block 614, the network technician connects the node switches 160 to the corresponding global switches 140 in the group 130, as indicated in block 614. In doing so, in the illustrative embodiment, the network technician connects the node switches 160 to the global switches 140 with copper cables, as indicated in block 616. Afterwards, the method 600 advances to block 618, in which the network technician positions a set of nodes 180 in a portion of a cabinet. In doing so, the network technician may position the set of nodes 180 in a different portion of the same cabinet as the node switches 160 and the global switches 140 (e.g., in the upper portion 422 of the cabinet 420), as indicated in block 620. Alternatively, the network technician may position the set of nodes 180 in a different cabinet (e.g., the cabinet 410, or the cabinet 430) that is adjacent to the cabinet 420 in which the node switches 160 and global switches 140 are located, as indicated in block 622. Subsequently, the method 600 advances to block 624, in which the network technician determines whether to add more nodes 180 for connection to the group 130. In doing so, the network technician may determine a desired ratio of nodes 180 to switches 140, 160 for the group (e.g., three to one, two to one, one to one, etc.). In block 626, the network technician determines the subsequent action to perform based on the determination of whether to add more nodes 180 for connection to the group 130. In response to a determination to add more nodes (e.g., to increase the ratio of nodes 180 to switches 140, 160), the method 600 loops back to block 618 in which the network technician positions an additional set of nodes 180 in a portion of a cabinet. Otherwise, the method 600 advances to block 628 of FIG. 7, in which the network technician connects the node switches 160 of the group 130 to the corresponding nodes 180 in the cabinet(s).

Figure 7:
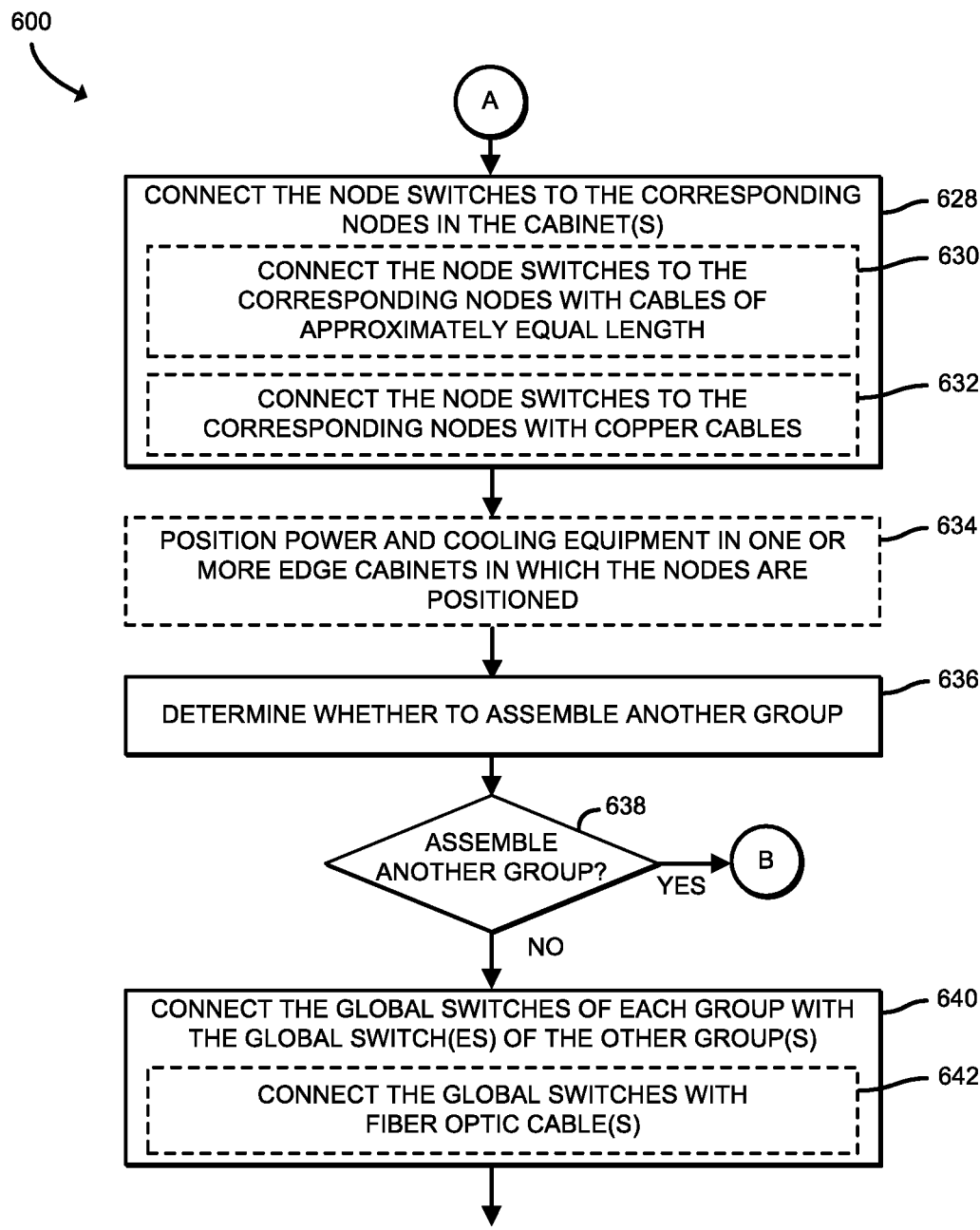

Referring now to FIG. 7, in connecting the node switches 160 to the corresponding nodes 180, the network technician may connect the node switches 160 to the corresponding nodes 180 with cables of approximately equal length (e.g., within 2 inches of the length of any other cable), as indicated in block 630. In connecting the node switches 160 to the corresponding nodes 180, the network technician may connect the node switches 160 to the corresponding nodes 180 with copper cables, as indicated in block 632. As such, in connecting the node switches 160 to the corresponding nodes 180, the network technician may avoid the cost of more expensive cables made of different materials (e.g., optical fiber). Subsequently, in block 634, the network technician may position power and cooling equipment (e.g., the power and cooling equipment 460) in one or more cabinets located on an edge (e.g., on either end of a row of cabinets) in which the nodes 180 are positioned.

In block 636, the network technician determines whether to assemble another group 130. In doing so, the network technician may compare the number of groups 130 that have been assembled to the total number of groups 130 that are to be included in the network 110. In block 638, the network technician determines the subsequent action to perform in response to the determination of whether to assemble another group. In response to a determination to assemble another group, the method 600 loops back to block 604 of FIG. 6, in which the network technician orients another stack of node switches orthogonally to another stack of corresponding global switches of a different group 130 in a different portion of a cabinet. Otherwise, the method 600 advances to block 640, in which the network technician connects the global switches 140 of each group 130 with the global switches 140 of the other groups 130 in the network 110. The network technician may connect the global switches 130 to each other directly, such as in a Megafly topology, or indirectly, such as through root switches (not shown) in a three-level fat-tree topology. In connecting the global switches 140, the network technician may connect the global switches 140 with fiber optic cables, as indicated in block 642, as the links 154 between the global switches 140 may span greater distances and/or carry more data than the links 150 between the node switches 160 and global switches 140 within a group 130 or the links 152 between the node switches 160 and the corresponding nodes 180.

EXAMPLES

Illustrative examples of the technologies disclosed herein are provided below. An embodiment of the technologies may include any one or more, and any combination of, the examples described below.

Example 1 includes a group of switches comprising a stack of node switches that includes a first set of ports; and a stack of global switches that includes a second set of ports; wherein the stack of node switches is oriented orthogonally to the stack of global switches, the first set of ports are oriented towards the second set of ports, and the node switches are connected to the global switches through the first and second sets of ports.

Example 2 includes the subject matter of Example 1, and wherein the number of node switches in the group is different than the number of global switches.

Example 3 includes the subject matter of any of Examples 1 and 2, and wherein each node switch is connected to each global switch in the group through the first set of ports.

Example 4 includes the subject matter of any of Examples 1-3, and wherein the group is positioned in a portion of a cabinet.

Example 5 includes the subject matter of any of Examples 1-4, and wherein the node switches are connected to a plurality of nodes that are positioned in a second portion of the cabinet.

Example 6 includes the subject matter of any of Examples 1-5, and wherein the cabinet is a first cabinet and the node switches are connected to a plurality of nodes that are positioned in a second cabinet that is adjacent to the first cabinet.

Example 7 includes the subject matter of any of Examples 1-6, and wherein the second cabinet is positioned on one side of the first cabinet and the node switches are additionally connected to a plurality of nodes that are positioned in a third cabinet that is adjacent to the first cabinet on an opposite side of the first cabinet.

Example 8 includes the subject matter of any of Examples 1-7, and wherein the cabinet is a first cabinet and the node switches are connected to a plurality of nodes that are positioned in a second cabinet that includes power and cooling equipment.

Example 9 includes the subject matter of any of Examples 1-8, and wherein the node switches are connected to a plurality of nodes with cables of approximately equal length.

Example 10 includes the subject matter of any of Examples 1-9, and wherein the node switches are connected to a plurality of nodes with copper cables of approximately equal length.

Example 11 includes the subject matter of any of Examples 1-10, and wherein the global switches are connected to global switches of one or more other groups.

Example 12 includes the subject matter of any of Examples 1-11, and wherein the global switches are connected to the global switches of one or more other groups through fiber optic cables.

Example 13 includes the subject matter of any of Examples 1-12, and wherein the global switches are positioned in a cabinet that includes a plurality of nodes connected to a second set of node switches of another group.

Example 14 includes the subject matter of any of Examples 1-13, and wherein the group is a tray that is insertable into a cabinet.

Example 15 includes a method for assembling a group of switches, the method comprising orienting a stack of node switches orthogonally to a stack of corresponding global switches in a portion of a cabinet; and connecting the node switches to the corresponding global switches.

Example 16 includes the subject matter of Example 15, and wherein orienting the stack of node switches orthogonally to the stack of corresponding set of global switches comprises orienting ports for connections between the node switches and the global switches towards each other.

Example 17 includes the subject matter of any of Examples 15 and 16, and wherein orienting the stack of node switches orthogonally to the stack of global switches comprises orienting a number of node switches orthogonally to an equal number of global switches.

Example 18 includes the subject matter of any of Examples 15-17, and wherein connecting the node switches to the corresponding global switches comprises connecting the node switches to the corresponding global switches with copper cabling.

Example 19 includes the subject matter of any of Examples 15-18, and further including positioning a set of nodes in another portion of the cabinet.

Example 20 includes the subject matter of any of Examples 15-19, and wherein the cabinet is a first cabinet, the method further comprising positioning a set of nodes in a second cabinet that is adjacent to the first cabinet.

Example 21 includes the subject matter of any of Examples 15-20, and further including positioning power and cooling equipment in the second cabinet.

Example 22 includes the subject matter of any of Examples 15-21, and wherein the cabinet is a first cabinet, further comprising connecting the node switches to a set of nodes positioned in the first cabinet or in a second cabinet that is adjacent to the first cabinet.

Example 23 includes the subject matter of any of Examples 15-22, and wherein connecting the node switches to the set of nodes comprises connecting the node switches to the set of nodes with copper cables.

Example 24 includes the subject matter of any of Examples 15-23, and wherein the second cabinet is positioned on one side of the first cabinet, the method further comprising positioning additional nodes in a third cabinet that is adjacent to the first cabinet on an opposite side of the first cabinet; and connecting the node switches to the additional nodes in the third cabinet.

Example 25 includes the subject matter of any of Examples 15-24, and further including connecting the set of global switches to global switches of one or more other groups.

The invention claimed is:

1. A group of switches comprising:
    a first group of one or more switches that include a first set of one or more ports; and
    a second group of one or more switches that include a second set of one or more ports,
    wherein the first group of one or more switches is oriented perpendicular to the second group of one or more switches, at least one switch in the first group of one or more switches is connected to at least one switch in the second group of one or more switches through the first and second sets of one or more ports, and the first group of one or more switches are oriented parallel to a first plane and the second group of one or more switches are oriented parallel to a second plane, wherein the first plane is perpendicular to the second plane, and wherein the first set of one or more ports is connected to the second set of one or more ports using at least one cable.

2. The group of switches of claim 1, wherein a number of switches in the first group is different than a number of switches in the second group.

3. The group of switches of claim 1, wherein the group of switches is positioned in a portion of a cabinet.

4. The group of switches of claim 3, wherein at least one switch in the first group is connected to at least one node that is positioned in a second portion of the cabinet.

5. The group of switches of claim 3, wherein the cabinet is a first cabinet and at least one switch in the first group is connected to at least one node that is positioned in a second cabinet that is adjacent to the first cabinet.

6. The group of switches of claim 5, wherein the second cabinet is positioned on one side of the first cabinet and at least one switch in the first group is additionally connected to at least one node that is positioned in a third cabinet that is adjacent to the first cabinet on an opposite side of the first cabinet.

7. The group of switches of claim 3, wherein the cabinet is a first cabinet and at least one switch in the first group is connected to at least one node positioned in a second cabinet that includes power and cooling equipment.

8. The group of switches of claim 3, wherein at least one switch in the first group is connected to at least one node with one or more cables.

9. The group of switches of claim 8, wherein at least one switch in the first group is connected to at least one node with one or more copper cables.

10. The group of switches of claim 1, wherein the second group of one or more switches is connected to switches of one or more other groups.

11. The group of switches of claim 10, wherein the second group of one or more switches is connected to the switches of one or more other groups through fiber optic cables.

12. The group of switches of claim 1, wherein the second group of one or more switches is positioned in a cabinet that includes a plurality of nodes connected to a second set of switches of another group.

13. The group of switches of claim 1, wherein the group is supported by a tray that is insertable into a cabinet.

14. The group of switches of claim 1, wherein: the first group of one or more switches are coupled to one or more nodes and the second group of one or more switches are coupled to one or more switches.

15. The group of switches of claim 14, wherein: at least one node comprises one or more of: an input/output subsystem, at least one processor, compute circuitry, memory, or storage.

16. The group of switches of claim 1, wherein: at least one switch comprises one or more of: an input/output subsystem, at least one processor, compute circuitry, memory, or storage.

17. A method for assembling a group of switches, the method comprising:
    orienting a first group of one or more switches orthogonally to a corresponding second group of one or more switches in a portion of a cabinet, wherein the first group of one or more switches are oriented parallel to a first plane and the second group of one or more switches are oriented parallel to a second plane, wherein the first plane is orthogonal to the second plane; and
    connecting at least one switch in the first group of one or more switches to at least one switch in the corresponding second group of one or more switches, wherein the connecting at least one switch in the first group of one or more switches to at least one switch in the corresponding second group of one or more switches comprises using at least one cable.

18. The method of claim 17, wherein orienting the first group of one or more switches orthogonally to the corresponding second group of one or more switches comprises orienting ports for connections between at least one switch in the first group of one or more switches and at least one switch in the second group of one or more switches towards each other.

19. The method of claim 17, wherein orienting at least one switch in the first group of one or more switches orthogonally to at least one switch in the second group of one or more switches comprises orienting a number of switches in the first group orthogonally to an equal number of switches in the second group.

* * * * *